Sept. 24, 1935.  A. J. GINSBERG  2,015,623
OPTICAL BENCH
Filed May 25, 1933  2 Sheets-Sheet 1
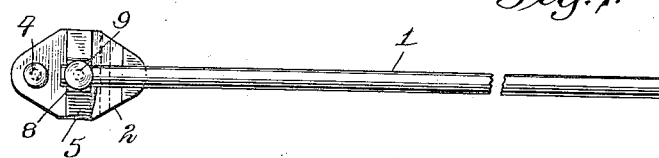
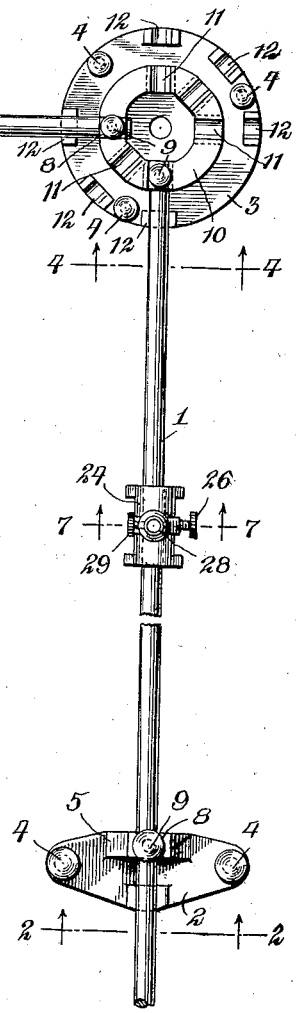
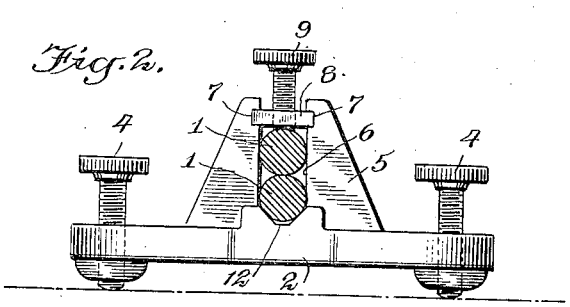
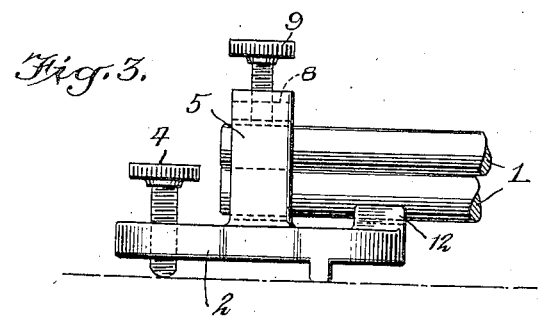
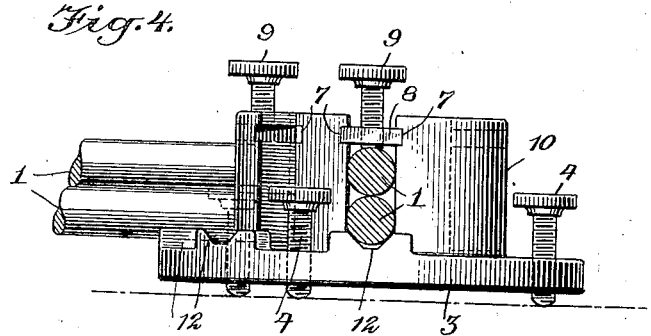
WITNESSES
INVENTOR
Abraham J. Ginsberg
BY
ATTORNEYS Sept. 24, 1935.    A. J. GINSBERG    2,015,623
OPTICAL BENCH
Filed May 25, 1933    2 Sheets-Sheet 2
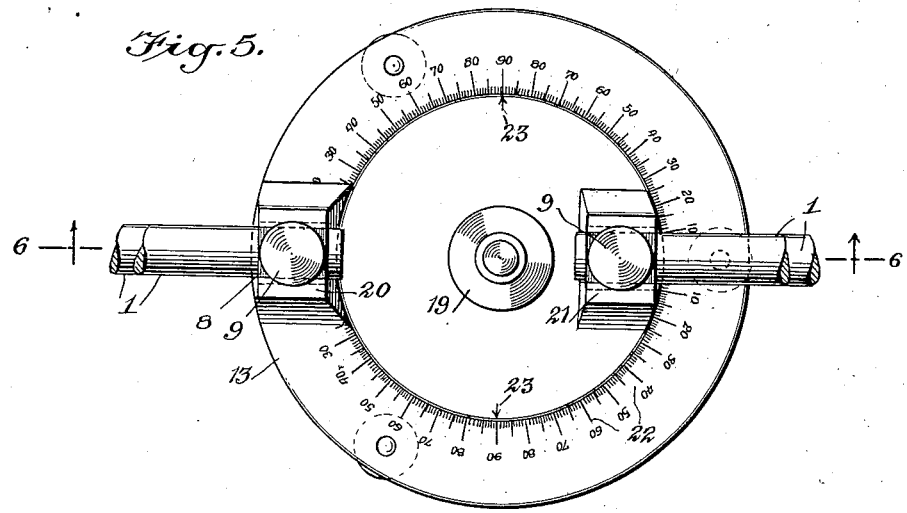
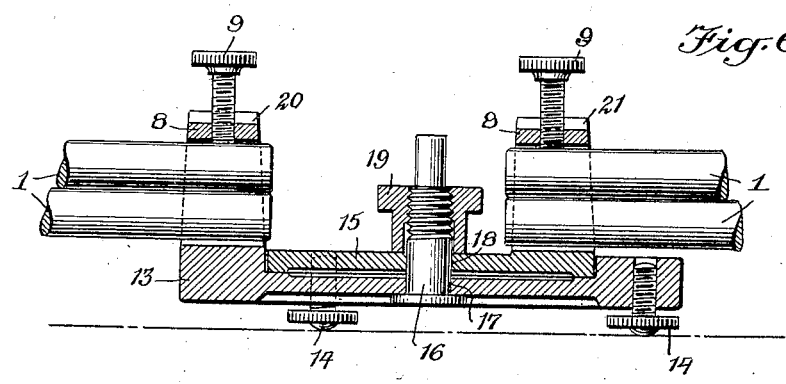
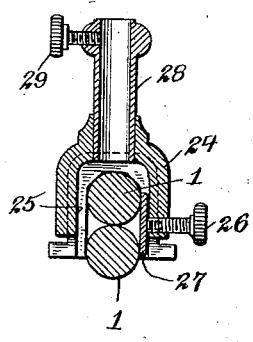
WITNESSES
INVENTOR
Abraham J. Ginsberg
BY
ATTORNEYS Patented Sept. 24, 1935

2,015,623

UNITED STATES PATENT OFFICE 2,015,623

OPTICAL BENCH

Abraham J. Ginsberg, New York, N. Y.

Application May 25, 1933, Serial No. 672,890

3 Claims. (Cl. 88—23)

This invention relates to optical benches, an object of the invention being to provide a bench of this character including a plurality of rods, with improved means for supporting and securing the rods so that optical apparatus may be secured and supported on the rods in exact alignment or at precise, known angles.

Heretofore the rails or bars of optical benches have been angular in cross section, which necessitates exact machining to insure proper alignment. With my improved bench by the employment of a plurality of rods, preferably circular in cross section, no machining is necessary, the bench can be manufactured at a much less cost and yet there will be extreme accuracy of alignment.

A further object is to provide a bench of this character in which the parts may be quickly and securely clamped, and which insures a proper leveling and alignment for angular disposition.

With these and other objects in view, the invention consists in certain novel features of construction and combinations and arrangements of parts, all of which will be more fully hereinafter described and pointed out in the claims.

In the accompanying drawings—

Figure 1 is a broken plan view illustrating my improved optical bench;

Figure 2 is an enlarged view in vertical section on the line 2/2 of Figure 1;

Figure 3 is a view in elevation at right angles to Figure 2;

Figure 4 is a sectional elevation taken on the line 4/4 of Figure 1;

Figure 5 is a fragmentary plan view illustrating another form of support which permits of adjustment to allow the rods to be located in alignment or at any desired angle relative to each other;

Figure 6 is a view in longitudinal section on the line 6/6 of Figure 5; and

Figure 7 is a view in section on the line 7/7 of Figure 1.

In constructing my improved bench I employ a plurality, preferably two, of rods 1—1 for each section of the bench. These rods need no machining and they are located one above the other, and are held securely so that any desired arrangement of brackets may be supported thereon and held in perfect alignment or at exact angles to each other.

I have illustrated several different types of support. Supports 2 are employed to receive the rods at or adjacent their ends, and a support 3 receives the ends of the rods to hold a plurality of benches at an angle to each other. All of these supports have leveling screws 4 which may be adjusted to exactly level the device.

Each of the supports 2 have uprights 5 with recesses 6 therein, the walls of said recesses being spaced apart just sufficiently to receive the rods 1 and hold them one above the other. Recesses 7 are formed in the walls of the recesses 6 to receive angular plates or nuts 8 with set-screws 9 therein, so that when the plates 8 are inserted in the recesses 7 and the set screws 9 screwed downwardly the rods will be securely clamped and the plate 8 will be securely clamped in its recess. In other words, by moving the screws 9 downwardly a downward pressure is imparted to the rods and an upward pressure is imparted to the plates 8, and there is a rigid securing action; but when the screws are turned in the opposite direction the plates can be readily slid out of the recesses 7 by moving the plates transversely.

The support 3 has a central raised portion 10 provided with a plurality of recesses 11 to receive the rods 1, and the set screws 9 and plates 8 are employed in these recesses and constructed and operate precisely like those above described. The support 3 also has rests 12 at its outer portion in which the rods lie, and all of these recesses 11 and rests 12 are located at various angles relative to each other, so that a pair of benches may be rigidly secured at any desired angle.

In Figures 5 and 6 of the drawings I illustrate a support 13 which has leveling screws 14 under the same. This support 13 provides mounting for a turn plate 15 which is held and clamped by means of a bolt 16 extending upwardly through central openings 17 and 18 in the support 13 and plate 15 respectively, and a nut 19 is screwed onto the threaded upper end of the bolt and bears against the plate 15 to clamp the latter in any position of rotary adjustment. The support 13 carries a fixed slotted upright 20 having the same arrangement of plate 8 and set screw 9 as above described, and a recessed upright 21 is rigid with the plate 15 and also has the same arrangement of plate 8 and set screw 9 to clamp the rods 1.

The support 13 may have a suitable scale 22 thereon with pointers 23 on the plate 15 to register with the scale and indicate the precise angles. My invention is, of course, not limited to the particular types of brackets and devices supported on the optical bench, but I have illustrated in Figures 1 and 7 a form of bracket 24 which will properly function. This bracket 24 has a recessed or bifurcated lower portion 25 to receive the rods 1 with a set screw 26 in one side engaging a plate 27 bearing against the rods 1 to clamp the bracket on the rods. This bracket may have a tubular standard 28 to receive an optical instrument with a set screw 29 to clamp the instrument in the bracket.

It is understood that the rods may be separate and independent or they may also be secured rigidly together.

While I have illustrated what I believe to be the preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. An optical bench including a plurality of rods supported one above the other, recessed supports receiving the rods, each of said supports having recesses in the walls of the first mentioned recesses, a plate movable onto and out of said last mentioned recesses, and a set screw projected through a screw threaded opening in the plate and adapted to engage one of the rods to clamp them in the support.

2. An optical bench including a support, leveling screws on the support, an upright on said support having a recess therein, a pair of rods in the recess located one above the other, a removable plate in the upper portion of the recess, and a set screw in the plate engaging the upper rod.

3. An optical bench including a support, a plate mounted to turn on the support, means for clamping the plate against movement on the support, said support having a scale with registering marks on the plate, two sets of rods, one set secured to the plate and the other set secured to the support, whereby the adjustment of the plate on the support varies the angular disposition of the sets of rods relative to each other, said rod-securing means comprising upwardly projecting recessed members, the recesses being of a width to accommodate the rods so that when the latter are clamped in the recesses they are held against displacement.

ABRAHAM J. GINSBERG.